B. W. HURD.
FUEL INDICATOR FOR INTERNAL COMBUSTION ENGINES.
APPLICATION FILED JUNE 27, 1917.
1,268,718.
Patented June 4, 1918.
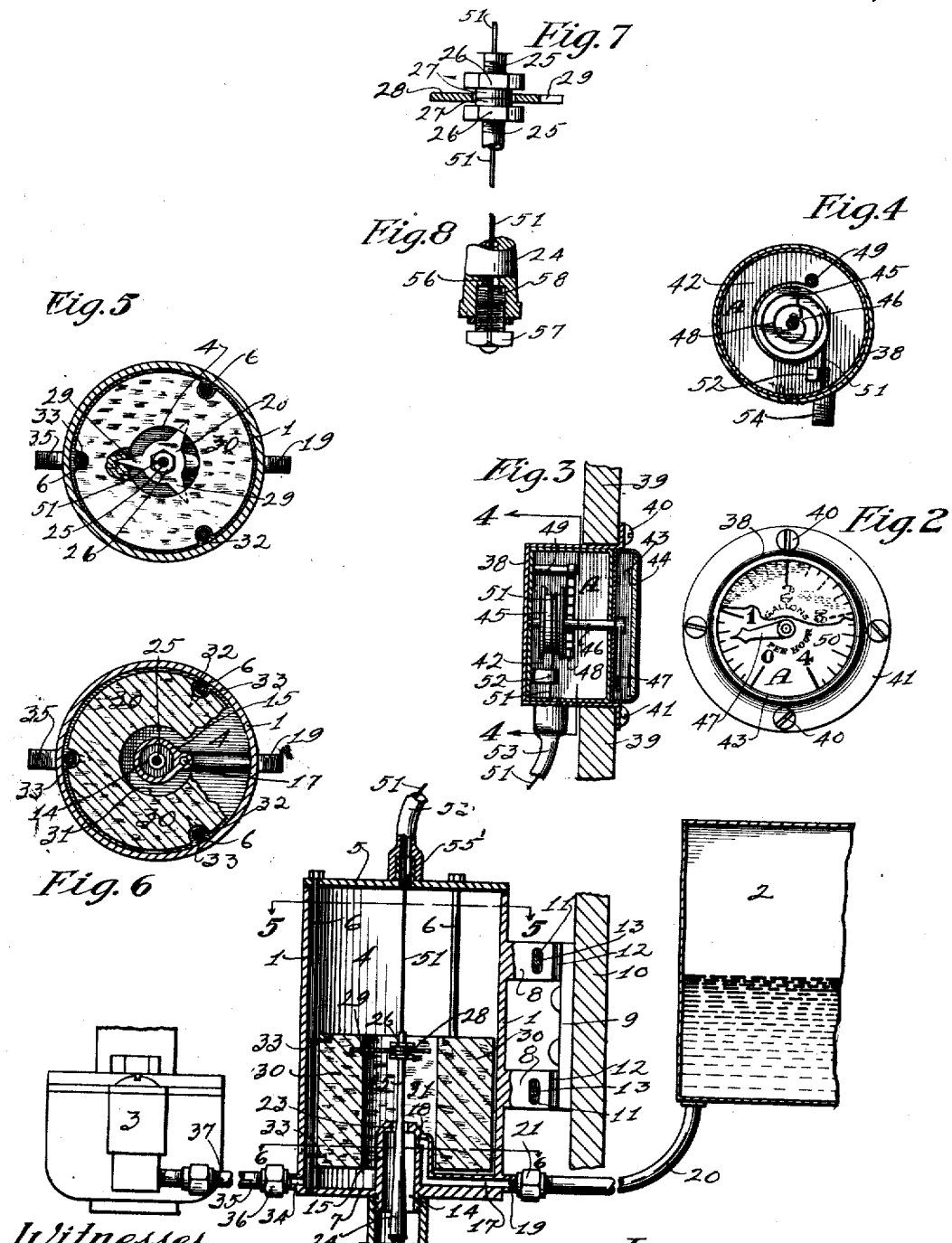
INVENTOR,
Benjamin W. Hurd,

UNITED STATES PATENT OFFICE.

BENJAMIN W. HURD, OF SIERRA MADRE, CALIFORNIA, ASSIGNOR OF ONE-THIRD TO GEORGE E. MESECAR, OF SIERRA MADRE, CALIFORNIA.

FUEL-INDICATOR FOR INTERNAL-COMBUSTION ENGINES.

1,268,718.         Specification of Letters Patent.    Patented June 4, 1918.

Application filed June 27, 1917. Serial No. 178,304.

*To all whom it may concern:*

Be it known that I, BENJAMIN W. HURD, a citizen of the United States, residing at Sierra Madre, in the county of Los Angeles and State of California, have invented new and useful Improvements in Fuel-Indicators for Internal-Combustion Engines, of which the following is a specification.

My invention relates to means for indicating the rate of fuel consumption in internal combustion engines such as are employed on motor propelled vehicles, or stationary engines, and the primary object is to provide an indicator supported on the instrument board of a vehicle so as to be clearly visible at all times to the operator and arranged to indicate the rate of fuel consumption in gallons per hour or miles per gallon.

A further object is to provide means for connecting the indicator with the fuel supply system of the engine at a point between the fuel tank and the carbureter so that the quantity of fuel supplied to the engine, under all conditions, may be employed for registering upon the dial of the indicator the proportionate rate of consumption.

My indicator is preferably used in connection with the commonly used types of speedometers which indicate the speed of the vehicle in miles per hour, and the indicating means, is therefore arranged for indicating the fuel consumption in gallons per hour, so that by combining the two readings at any time the rate of fuel consumption in miles per gallon of fuel may be readily obtained. For instance, at a given time and under given conditions, the speedometer reading being "30 miles per hour" and the fuel indicator reading being "3 gallons per hour", it will be obvious that the rate of fuel consumption will be "10", thus representing one gallon of fuel used for ten miles, this result being obtained by dividing 30 by 3.

A further object of my invention is to provide a simple and economical structure which may be readily attached to all types of motor vehicle or other engines without alteration of any of the parts of the engine or indicating means and which may be easily cleaned when necessary.

A further object is to provide means between the fuel suply tank and the engine through which the volume of fuel used must of necessity pass and whereby the proportionate rates of supply and discharge therefrom may be varied and regulated, and the difference, if any, between the rates of supply and discharge employed for registering the rate at which the fuel is being used.

It will be understood, from the consideration of the specification hereinafter following and the drawings hereto annexed, that my invention, in a slightly modified form, may be used for indicating the rate of discharge of other liquids than fuel by the interposition of the measuring device between the source of supply and the point of discharge, and, therefore, other uses than the foregoing may be found to which my improved device may be put.

I attain the above objects by means of the structure shown in the drawings hereto annexed and forming a part of this application, in which: Figure 1 is an elevation of my fuel indicating system as attached to a motor vehicle engine, shown in section. Fig. 2 is a front view of the indicator and housing. Fig. 3 is a sectional elevation of the indicator and housing. Fig. 4 is a longitudinal sectional elevation of the same on line 4—4 of Fig. 3. Fig. 5 is a sectional plan of Fig. 1 on line 5—5 and Fig. 6 is a sectional plan of the same on line 6—6. Fig. 7 is an enlarged view of the needle valve stem and support therefor. Fig. 8 is a fragmentary view, partly in section, of the needle valve head. Similar characters of reference are employed throughout the specification and the several views of the drawings for indicating the same or like parts.

Referring to the several coöperating elements and the preferred form thereof as disclosed in the drawings for carrying out the objects of my invention, the device comprises briefly, an auxiliary fuel receptacle 1 suitably supported at a point between and in communication with the usual fuel tank 2 and the carbureter 3, and an indicator mechanism A adapted to be supported at a convenient point on the vehicle instrument board.

The receptacle 1 is of cylindrical formation and has a float chamber 4 on the interior which is closed at the top by means of a removable cover 5 held in position by means of a plurality of rods or bolts 6 threaded into the bottom 7, and a suitable gasket or packing piece may be placed between the cover 5 and the end of the receptacle for rendering the chamber 4 water or liquid tight. Suitable lugs 8 are formed on or attached to the periphery of the receptacle 1 which may be adjustably attached to a bracket 9 supported on the dash board 10 of the vehicle, so that the height of the receptacle, for reasons which will hereinafter appear, may be adjusted. The manner of adjusting the height of the receptacle shown, consists of moving the lugs 8 relative to the elongated slots 11 formed in the lugs 12 of the bracket 9, through which screws or bolts 13 held in the lugs 8 on the receptacle, may be extended and tightened.

The lower end of the receptacle has an integrally formed valve chamber 14, the walls 15 of which extend substantially upward into the float chamber 4 and also below the outer surface of the bottom 7, and a cap 16 is adapted to be threaded on the lower extension of the valve chamber walls, forming a closure for the valve chamber when the device is in use and permitting the same to be cleaned at any time when the cap is removed. A cored fuel passage 17 is formed in the floor of the chamber 4 which has an extension paralleling the chamber 14 with which the passage communicates at a point 18 near the top of the chamber 14. The outer end of passage 17 terminates in a lug 19 formed on the periphery of the receptacle 1 and is connected with the main fuel tank 2 by means of a relatively small tube 20 in which a union 21 is placed for facilitating the connection of the tube. Thus, the fuel from the tank 2 is permitted to flow uninterruptedly through passage 17 and tube 20 into the valve chamber 14 in the receptacle.

The upper end of the valve chamber 14 has a beveled valve seat and opening 23 formed therein which slidably receives an inverted and correspondingly tapered needle valve 24 having an upwardly extended stem 25 which is threaded at the upper end to receive a pair of nuts 26, shown in Figs. 1 and 7. These nuts have enlarged hexagonal or square portions by means of which they may be turned for attachment to and detachment from the valve stem and reduced abutting end portions 27, and a thin metallic spider 28 is held between the turning portions of the nuts with but slight play or clearance so as to permit the adjustment of the valve stem to any slight variation from a vertical plane which may result from or ensue during the operation of the indicator.

The prongs 29 of the spider are adapted to pierce the internal periphery of the centrally positioned float 30 which is preferably of cork, thus serving to hold the valve stem centrally in the hollow 31 of the float. The vertical cover retaining rods 6 serve as guides for the vertical movement of the float 30 in the chamber 4, peripheral grooves 32 being formed in the float for engagement with said rods and a pair or more of pointed metallic clips 33 having suitable eyes for receiving the rods being provided for holding the float in operating position, the points of the clips piercing the periphery of the float, as shown in Figs. 1 and 6.

It will be obvious from the foregoing description of the structure of the receptacle 1 and its connections, that the fuel from tank 2 will flow through passage 17 and tube 20, as stated to valve chamber 14, and when the valve 24 is in such a position that a clearance in the valve seat will be provided, the fuel will flow into the chamber 4 of the receptacle, and the float 30 will rise to the level of the fuel in the chamber, thus raising the valve correspondingly, by means of the connections described. An outlet for chamber 4 is provided at 34 on the periphery of receptacle 1 and at a point diametrically opposite to the passage 17, a lug 35 being provided which is connected by means of a union 36 and tube 37 with the carbureter 3, and the area of the inlet passage 17 and outlet 34 should be equal or substantially so for the best results.

The indicating means forming part of my invention consists of a receptacle 38 having an opening on the front side of the instrument board 39 of the vehicle to which the indicating means is attached by means of screws 40 extending through a flange 41 on the receptacle 38; a housing 42 for holding the indicator actuating means and slidably disposed in the receptacle 38; and an indicator housing 43 also held in the receptacle and having a glass 44 suitably held in the front end thereof for rendering the operation of the indicator visible to the operator at all times.

A drum 45 is revolubly supported in the housing member 42 on a spindle 46, journaled in the rear and front walls of the housing and extended at the forward end through the rear wall of the front housing member 43, the spindle being provided within the housing 43 with a pointer 47. A flat spiral spring 48 is provided for attachment at opposite ends to the spindle 46 and a stud 49 held on the rear wall of the housing 42, respectively, and serves to revolve the spindle and drum when the spring is in tension, for moving the indicator or pointer 47 over the graduated surface of the rear wall of the housing member 43, the scale 50 thus formed being marked, as shown, in gallons and fractions of gallons per hour and the indicator being movable in a clock-wise direction around the scale.

A small flexible wire or cable 51 is provided for operably connecting the drum 45 with the valve 24, and the upper end of this wire is given a few turns around and is secured to the drum, is threaded through a guide 52 attached to the wall of the housing 42 and is then extended downwardly through a tube 53 which is threaded at opposite ends to lugs 54 and 55, respectively, formed on the housing member 42 and the cover 5 of receptacle 1. The lower end of the wire extends through a small bore 56 in the valve 24 and the stem thereof and the end thereof is provided with a suitable head for engagement with the lower end or head of an adjustment nut 57, through which the wire also is extended, and the nut is internally threaded into a counterbore 58 in the valve head. It will be obvious that when the nut 57 is adjusted in the counterbore of the valve head, the position of the pointer relative to the scale in housing member 43 may be regulated, by means of the tension of the spring 48.

In operation, the time necessary in which to completely evacuate a tank of a given body of fuel through a pipe of given area being first determined, and the tubes 20 and 37 being of equal area and attached to the tank 2 and carbureter 3, respectively, the possible discharge from receptacle 1 will equal the supply thereto; but the clearance around the valve 24 of the opening in valve chamber 14 communicating with chamber 4 of the receptacle serves to restrict the discharge of the fuel into the receptacle to a degree proportionate with the requirements of the engine, and there will usually be a surplus quantity of fuel stored in the receptacle, thus raising the float 30 a corresponding distance from its lowermost limit of action.

When the engine is in operation, as the fuel is withdrawn from the chamber 4, the float 30 is gradually lowered and the area of the valve opening correspondingly increased, until the float attains the lowermost limit of action, whereupon the maximum volume of fuel will be discharged from valve chamber 14 into chamber 4, and in such case, the supply of fuel to chamber 4 will exceed the discharge to the carbureter until a neutral point midway between the limits of action of the float is attained, when the supply and discharge will be equal, and if the requirements of the engine remain the same as at this point the float will remain suspended centrally between its limits of action until the conditions are changed.

When the float attains its uppermost plane of action, the valve opening substantially restricted by valve 24, the supply of fuel to chamber 14 will be less than the possible discharge from chamber 4 to the carbureter, and the requirements of the engine being relatively small the float will remain in the plane of action stated until conditions are again changed, and will be again lowered as the volume of fuel necessary for operating the engine is increased. Thus, when the float is at its highest plane in chamber 4, a minimum amount of fuel will be used by the engine and when at its lowest plane a maximum amount will be used and the movement of the float in its vertical plane of action will at all times be proportionate to the amount of fuel used by the engine.

From the connection described between the float and indicator, it will be readily understood that a given movement in a vertical direction of the float 30 will effect a given and corresponding rotary movement of the drum and spindle with which the float is connected, and the indicator or pointer will thus be moved to a corresponding distance over the scale in housing 43. The movement of the float and indicator being proportionate to the flow of the fuel in gallons per hour, the relative use of the fuel will be so indicated by the pointer on the scale, as at "1", "2", "3", "4", etc., representing gallons per hour. As hereinbefore stated, the miles per gallon may be obtained by dividing the speedometer reading by the indicator reading. The position of the indicator will vary according to the use of the fuel in a manner similar to a speedometer.

It will be understood that with the rising of the float in chamber 4, the tension on spring 48 will be relieved correspondingly, and the pointer thus moved; while the downward movement of the float will increase the tension of the spring correspondingly, the float being of sufficient weight for this purpose.

The discharge of any liquid from a tank may be regulated and the rate of flow measured by the attachment of the receptacle 1 and indicator to the tank.

It is conceived to be possible to modify and alter the structure shown without enlarging the scope of or departing from the spirit of my invention, and I desire to claim broadly thereon.

Having thus described my invention, what I claim, is:

1. An indicating mechanism comprising a fluid receptacle having a main chamber provided with an outlet, a valve chamber between said inlet and outlet, an inlet passage to said valve chamber out of communication with said main chamber and communicating with the interior of said receptacle, a spring retracted indicator, a float in said receptacle connected with and for operating said indicator, and a valve in said chamber supported on said float for regulating the flow of the liquid.

2. An indicating mechanism comprising an indicator, a fluid receptacle having a main fluid chamber and a valve chamber communicating therewith, a valve in said valve chamber extending into said fluid chamber, a float suspended in said fluid chamber for supporting said valve, said valve being adapted to close the opening between said chambers as the liquid rises in said main chamber, and means for operably connecting said float with said valve and said indicator for operating said valve and said indicator correspondingly.

3. An indicating mechanism comprising a stationary dial and a movable indicator, a fluid receptacle having an inlet and an outlet, a valve in said receptacle, a cable connecting said valve with said indicator, a rigid tube for incasing said cable, a float suspended in said receptacle, and means for supporting said valve on said float, for actuating said valve and said indicator relative to the flow of liquid through said receptacle.

4. An indicating mechanism comprising an indicator, a casing having a main liquid chamber, a valve casing extending into and having a chamber communicating with said main chamber, an inlet passage extending through the floor of said receptacle to said valve chamber, outlet means for said main chamber and combined valve and indicator actuating means in said main chamber, and means for directly connecting said actuating means with said indicator.

5. An indicating mechanism comprising an indicator, a liquid receptacle having a valve disposed therein, a float for actuating said valve, a cable for directly connecting said valve with said indicator for effecting an equal movement of the indicator relative to the valve, and a rigid tube connecting said receptacle and said indicator for incasing said cable.

6. An indicating mechanism comprising in combination an indicator, a receptacle having a fluid chamber therein, a valve chamber centrally formed below said liquid chamber and having a valve port for affording communication between said chambers, an inlet passage leading from the exterior of said receptacle to and in communication with said valve chamber and disconnected from said fluid chamber, a float mounted within said fluid chamber and adapted to rise and fall, respectively, with the rise and fall of the liquid therein, a needle valve supported on said float and extending through said port into said valve chamber for regulating the flow of the liquid from said valve chamber into said fluid chamber, a rigid tube connecting said indicator and said receptacle, and a cable for connecting said indicator and said valve, and adapted to be incased by said tube.

7. In a device of the character described, an indicator housing and a fluid receptacle spaced apart and in communication with each other, an indicator mounted in said housing, a float mounted in said receptacle, a cable connecting said indicator and said float, an inlet chamber being formed in the bottom of said receptacle and adapted to be connected with a liquid supply means, and a valve connected with said float and operating in said chamber for regulating the flow of liquid therefrom to said receptacle, the rising of the liquid and said float in said receptacle serving to restrict the inlet passage thereto.

8. In a device of the character described, the combination with a primary fluid receptacle and a carbureter, of an auxiliary receptacle having a main liquid chamber and an inlet chamber therein, liquid supply means connecting said primary receptacle directly with said inlet chamber, an outlet for said auxiliary receptacle connected with said carbureter, a conical valve operating between said inlet chamber and said main chamber for regulating the flow of liquid, an indicator, a float in said main chamber connected with said valve, and means for directly connecting said float and said valve with said indicator for controlling the movement of the indicator, relative to said float.

9. In a device of the character described, the combination with mechanism for indicating the rate of flow of the liquid, of a fluid receptacle having a main fluid chamber and an inlet chamber formed below and extending upwardly into said main chamber, and a valve seated in said inlet chamber and extending into said main chamber and connected with said indicating mechanism, and a float in said main chamber for operating said valve, substantially as described.

10. In a device of the character described, the combination with mechanism for indicating the rate of flow of the liquid, of a fluid receptacle having a main fluid chamber and an inlet chamber formed in the bottom of said main chamber, a float movably supported in said main chamber, and a valve seated in said inlet chamber and attached to said float and operably connected with said indicating mechanism.

11. In a device of the character described, the combination with mechanism for indicating the rate of flow of the liquid, of a fluid receptacle having a main liquid chamber and an inlet chamber formed in the bottom of said main chamber and communicating therewith, a float movably disposed in said main chamber, a conical valve seated in said inlet chamber and attached to said float, and means for connecting said valve and said float with said indicating mechanism, said float being adapted to raise said valve and restrict the opening between said main chamber and said inlet chamber when the liquid rises in said main chamber.

12. In a device of the character described, the combination of a fluid receptacle having a main fluid chamber provided with an outlet and an inlet chamber formed in the bottom of said main chamber and provided with an inlet passage disconnected from said main chamber, an indicator housing, a spring retracted indicator mounted therein, a float actuated valve seated in said inlet chamber, and adapted to regulate the flow of liquid therefrom to said main chamber, and means for connecting said valve directly with said indicator for indicating the rate of flow of the liquid through said receptacle.

BENJAMIN W. HURD.

Witnesses:
C. O. ALBRIGHT,
LUTHER L. MACK.